(12) United States Patent
Terada

(10) Patent No.: US 7,797,099 B2
(45) Date of Patent: Sep. 14, 2010

(54) APPARATUS FOR CONTROLLING OPERATION OF ENGINE MOUNTED ON VEHICLE PROVIDED WITH IDLE STOP FUNCTION

(75) Inventor: Hidetoshi Terada, Toyota (JP)

(73) Assignee: Denso Corporation, Kariya (JP)

( * ) Notice: Subject to any disclaimer, the term of this patent is extended or adjusted under 35 U.S.C. 154(b) by 140 days.

(21) Appl. No.: 12/269,071

(22) Filed: Nov. 12, 2008

(65) Prior Publication Data

US 2009/0138184 A1 May 28, 2009

(30) Foreign Application Priority Data

Nov. 12, 2007 (JP) ............... 2007-293372

(51) Int. Cl.
*F02D 45/00* (2006.01)
*F02D 43/00* (2006.01)

(52) U.S. Cl. ..................................... 701/112

(58) Field of Classification Search ................ 701/112, 701/113, 115; 73/116, 117.3; 123/179.3, 123/179.5

See application file for complete search history.

(56) References Cited

U.S. PATENT DOCUMENTS

| | | | |
|---|---|---|---|
| 6,308,129 B1 | 10/2001 | Uchida | |
| 6,493,628 B2 | 12/2002 | Ando | |
| 7,142,973 B2 * | 11/2006 | Ando | 701/112 |
| 7,316,217 B2 | 1/2008 | Yamada | |
| 7,472,688 B2 * | 1/2009 | Nakauchi et al. | 123/179.5 |
| 2004/0214689 A1 | 10/2004 | Kaneko | |

FOREIGN PATENT DOCUMENTS

| | | |
|---|---|---|
| JP | 2000-199444 | 7/2000 |
| JP | 2000-205026 | 7/2000 |
| JP | 2001-271700 | 10/2001 |
| JP | 2002-266674 | 9/2002 |
| JP | 2003-065103 | 3/2003 |
| JP | 2006-161785 | 6/2006 |
| JP | 2006-214408 | 8/2006 |

OTHER PUBLICATIONS

Japanese Office Action dated Nov. 10, 2009, issued in corresponding Japanese Application No. 2007-293372, with English translation.

* cited by examiner

*Primary Examiner*—Hieu T Vo
(74) *Attorney, Agent, or Firm*—Nixon & Vanderhye PC

(57) ABSTRACT

An apparatus is for controlling rotation of an engine mounted on a vehicle. In the apparatus, a count of a crank counter is updated based on a signal changing in accordance with rotation of a crankshaft. The count indicates a rotational position of the crankshaft. The rotation of the engine is controlled based on the count of the crank counter. An idle stop control member issues an engine stop request when it is determined that engine stop conditions are met, and then issues a command to crank the engine for restarting the engine when it is determined that engine start conditions are met. Further, an update prohibiting member prohibits the counter from being updated during a period of time ranging from a time instant when the engine stops in response to the engine stop request to a time instant when it is determined that the engine start conditions are met.

20 Claims, 10 Drawing Sheets

APPARATUS FOR CONTROLLING OPERATION OF ENGINE MOUNTED ON VEHICLE PROVIDED WITH IDLE STOP FUNCTION

CROSS REFERENCES TO RELATED APPLICATION

The present application relates to and incorporates by reference Japanese Patent Application No. 2007-293372 filed on Nov. 12, 2007.

BACKGROUND OF THE INVENTION

1. Technical Field

The present invention relates to an apparatus for controlling the operation of an internal combustion engine (simply engine) mounted on a vehicle that has a function for stopping idling operations thereof.

2. Related Art

In recent years, for vehicles, there have been higher requests for giving consideration to environmental issues and saving fuel consumption. One of countermeasures for those issues is to have vehicles equipped with idle stop functions (or idling stop functions). This system automatically stops the engine when the vehicle stops and automatically restarts the engine when the driver performs a given operation for restarting the running.

For making the idle stop function effective, it is general that this type of vehicle is provided with an ECU (electronic control unit) for controlling the idle stop function, besides an engine ECU (electronic control unit) for controlling the internal combustion engine (simply referred to as engines). The ECU for controlling the idle stop function is called "economic running (eco-run) ECU". The eco-run ECU detects the state where a predetermined engine stop condition showing a vehicle stop is realized. In response to this detection, the eco-run ECU issues a request to stop the engine toward the engine ECU, and then is involved in detecting a predetermined driver's operation intended to restart the run. At the time when such a driver's operation is detected, the eco-run ECU makes the starter operate to crank the engine.

Meanwhile, when receiving the engine stop request from the eco-run ECU, the engine ECU stops the engine by stopping the supply of the fuel to the engine. And, in response to the engine cranking operation ordered by the eco-run ECU, the engine ECU will restart the engine control (such as control operations for fuel injection and ignition) for the engine restart.

Additionally, the engine ECU is equipped with a crank counter that indicates rotational positions of the crankshaft of the engine (hereinafter called a crank position). If the engine ECU has no information showing a current crank position, the engine ECU detects the current crank position on the basis of a signal coming from a crank sensor (or a cam sensor), which is outputted depending on the rotation of the crankshaft. When the current crank position is completed, the engine ECU sets to its crank counter a value corresponding to the detected current crank position. Afterward, in the engine ECU, the count of the crank counter is updated in response to the signal from the crank sensor to monitor the newest crank position continuously. Thus the engine ECU uses the information indicating the newest crank position to control the fuel injection and the ignition thereof, as can be seen in vehicles with no idle stop function.

It is significant to have a higher start performance when the engine is required to restart from its idle stop state. This start performance is evaluated on how a period of time from a driver's operation for restarting the run to the actual start of the engine. To improve this start performance, that is, to shorten such a period of time, it is necessary to continuously hold the count of the crank counter gained when the engine is stopped, even during the idle stop, without resetting the count. This operation for continuously holding the count makes it possible to start the fuel injection and ignition as early as possible at the time of restarting the engine. This is because the count of the crank counter shows the actual crank position whenever it is necessary to restart the engine, without performing again a relatively time-consuming process for detecting the crank position (that is, a process for determining cylinders).

In this situation, there has been known a technique provided by Japanese Patent Laid-open Publication No. 2000-205026. This technique relates to how to determine malfunctions relating to a rotation angle signal. Specifically, in this publication, when, of the rotation angle signal and a reference signal which are outputted depending on the rotation of the output shaft of an engine, only the rotation angle signal is outputted but no reference signal is outputted, it is determined that the rotation angle signal is malfunctioning.

As stated, the count of the crank counter is required to be held as it is during the idle stop. Thus, it is requested that the engine ECU of a vehicle having the idle stop function hold the count during the idle stop. However, this gives rise to some drawbacks, which will now be described using FIG. 10.

It is generally understood that the count of the crack counter is updated every time when the signal outputted from the crank sensor (hereinafter referred to as a crank signal) is made effective.

In addition, as shown in FIG. 10, the crank sensor has a crank rotor 2 equipped with a plurality of protrusions (which are called teeth) 1 and a pickup 3 provided so as to face the crank rotor 2. The crank rotor 2 rotates together with the crankshaft of an engine, so that the pickup 3 outputs a pulse signal every time each of the protrusions 1 passes by the pickup 3. The protrusions 1 on the crank rotors 2 have vacancies by a predetermined number of protrusions, which produce a tooth-chipped portion 4. In this kind of crank sensor, a train of pulse signals outputted from the pickup 3 is treated as an output signal from the sensor (i.e., crank signal).

In the example shown in FIG. 10, the edges of the protrusions 1 which produce effective edges of the crank signal will now be referred to as "effective edge portions." It is possible that the engine is stopped at a timing when the effective edge portion of any protrusion 1 comes close to the pickup 3 and the crank shaft slightly reciprocates due to vibration of the vehicle and operations of on-vehicle auxiliary devices, as shown by a bidirectional arrow in FIG. 10. In this case, the engine is not in operation so that there no cranking, but noise occurs which involves the effective edges of the crank signal if the slight motions of the crankshaft are relatively large. Hence, in this case, the count of the crank counter in the engine ECU results in being updated erroneously. After this, when the engine is restarted, the engine ECU is to perform the fuel injection and ignition on the basis of the erroneous crank position, thus lowering the re-starting performance of the engine.

This problem may occur in the same way when factors other than the slight reciprocating motions of the crankshaft give noise to the crank signal. However, the technique provided by the above known publication cannot provide this kind of problem with a solution.

SUMMARY OF THE INVENTION

The present invention has been made in consideration of the above conventional situations, and an object of the present invention is to provide an engine control apparatus that is able to improve re-starting performance of the engine after the idle stop.

In order to achieve the above object, the present invention provides an apparatus for controlling rotation of an engine mounted on a vehicle, the engine being equipped with a crankshaft, comprising: updating means for updating a count of a counter based on a signal changing in accordance with rotation of the crankshaft, the count indicating a rotational position of the crankshaft; and engine control means for controlling the rotation of the engine based on the count of the counter, the engine control means includes idle stop control means issuing a request to stop the rotation of the engine when it is determined that a condition for stopping the rotation of the engine is met, and then issuing a command to crank the engine for restarting the engine when it is determined that a condition for restarting the engine is met; and update prohibiting means for prohibiting the counter from being updated during a period of time ranging from a time instant when the engine stops from rotating in response to the request to stop to a time instant when it is determined that the condition for restarting the engine is met.

According to this configuration, if noise occurs in the signal changing in accordance with rotation of the crankshaft during the automatic stop of the engine on the idle stop control, it is avoided that the count of the counter is updated erroneously. It is therefore possible to keep a correct count of the counter until the engine is restarted when releasing the idle stop. In restarting the engine, the fuel injection and ignition can be avoided from being erroneous in their precision. As a result, the restart performance of the engine, which is carried after the idle stop (engine's automatic stop), can be maintained at high levels.

BRIEF DESCRIPTION OF THE DRAWINGS

In the accompanying drawings:

FIG. 10 explains a problem the conventional technique is confronted with.

DETAILED DESCRIPTION OF PREFERRED EMBODIMENTS

Hereinafter various embodiments of the present invention will now be described, in which the apparatus for controlling the operations of engines which is according to the present invention is embodied as an idle stop control apparatus mounted on a vehicle (automobile) and produced to provide an idle stop function to the vehicle.

First Embodiment

Referring to FIGS. 1-4, a first embodiment of the present invention will now be described.

Figure 1:
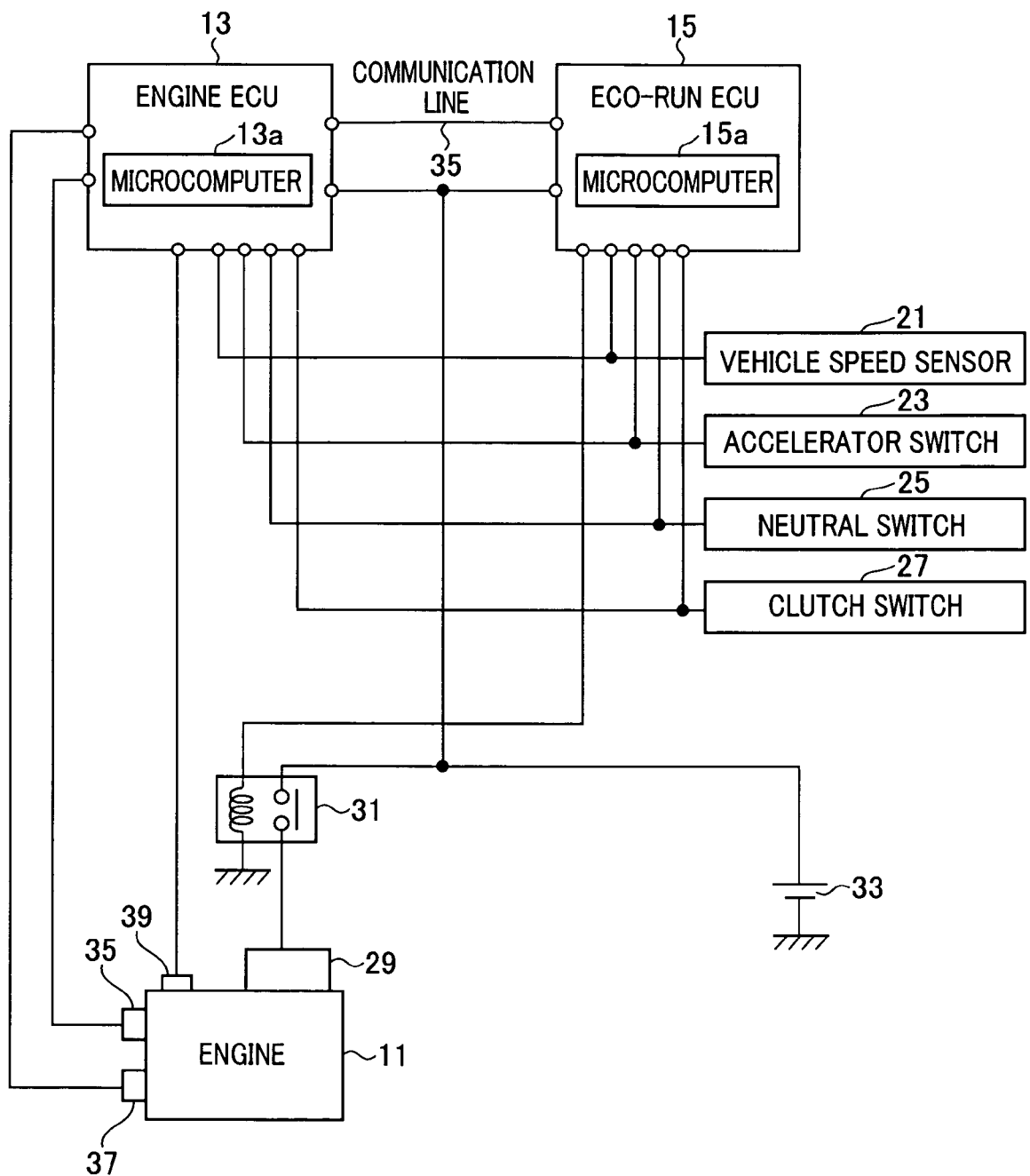
FIG. 1 is a block diagram showing the configuration of an idle stop control apparatus according to a first embodiment of the present invention.

As shown in FIG. 1, the idle stop control apparatus according to the first embodiment is provided with an engine ECU (electronic control unit) 13 for controlling an on-vehicle engine 11 and an eco-run ECU 15 for controlling the idle stop function. The vehicle exemplified here is a vehicle equipped with a manually operated transmission. Both of the engine ECU 13 and the eco-run ECU 15 are designed to activate processes in response to tuning the ignition switch (not shown) into its on state.

The eco-run ECU 15 has electric connections with various sensors and switches including a vehicle speed sensor 21, an accelerator switch 23, a neutral switch 25, a clutch switch 27, and the coil of a starter relay 31. The vehicle speed sensor 21 detects the traveling speed of the vehicle. The accelerator switch 23 is made ON when the accelerator pedal is depressed. The neutral switch 25 is made ON in response to a condition where the shift lever of the transmission is brought into its neutral position. The clutch switch 27 is made ON when the clutch pedal of the transmission is depressed. The starter relay 31 is disposed for starting a starter 29 to crank an engine 11 mounted on this vehicle. Incidentally the starter relay 31 is made ON when current is supplied to the coil thereof. Accordingly, the starter 29 is powered by a battery mounted on the vehicle, so that the starter 29 is activated.

In addition, the eco-run ECU 15 can communicate with the engine ECU 13 via a communication line 35.

Meanwhile, the engine ECU 13 has also electric connections with the vehicle speed sensor 2 and the switches 23 to 27.

The engine ECU 13 has additional electric connections with various sensors for detecting operated states of the engine. Such sensors include a crank sensor 35, a cam sensor 37, and an intake-air amount sensor. Also the engine ECU has electric connections with an injector 39 for fuel injection, an ignition device (not shown), and others, which are actuators for operating the engine 11.

Figure 4:
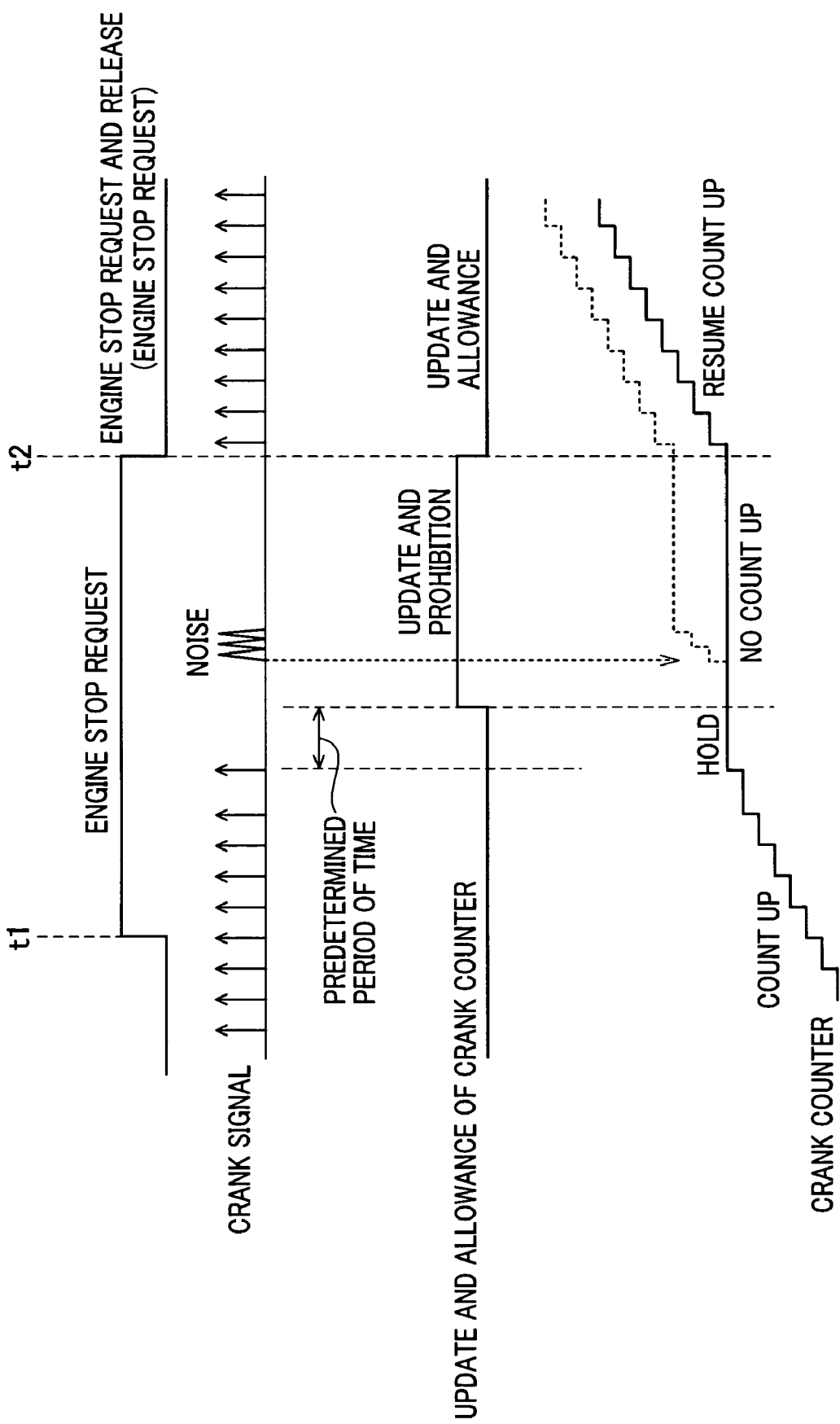
FIG. 4 is a timing chart explaining the operations of the idle stop control apparatus according to the first embodiment.
Figure 10:
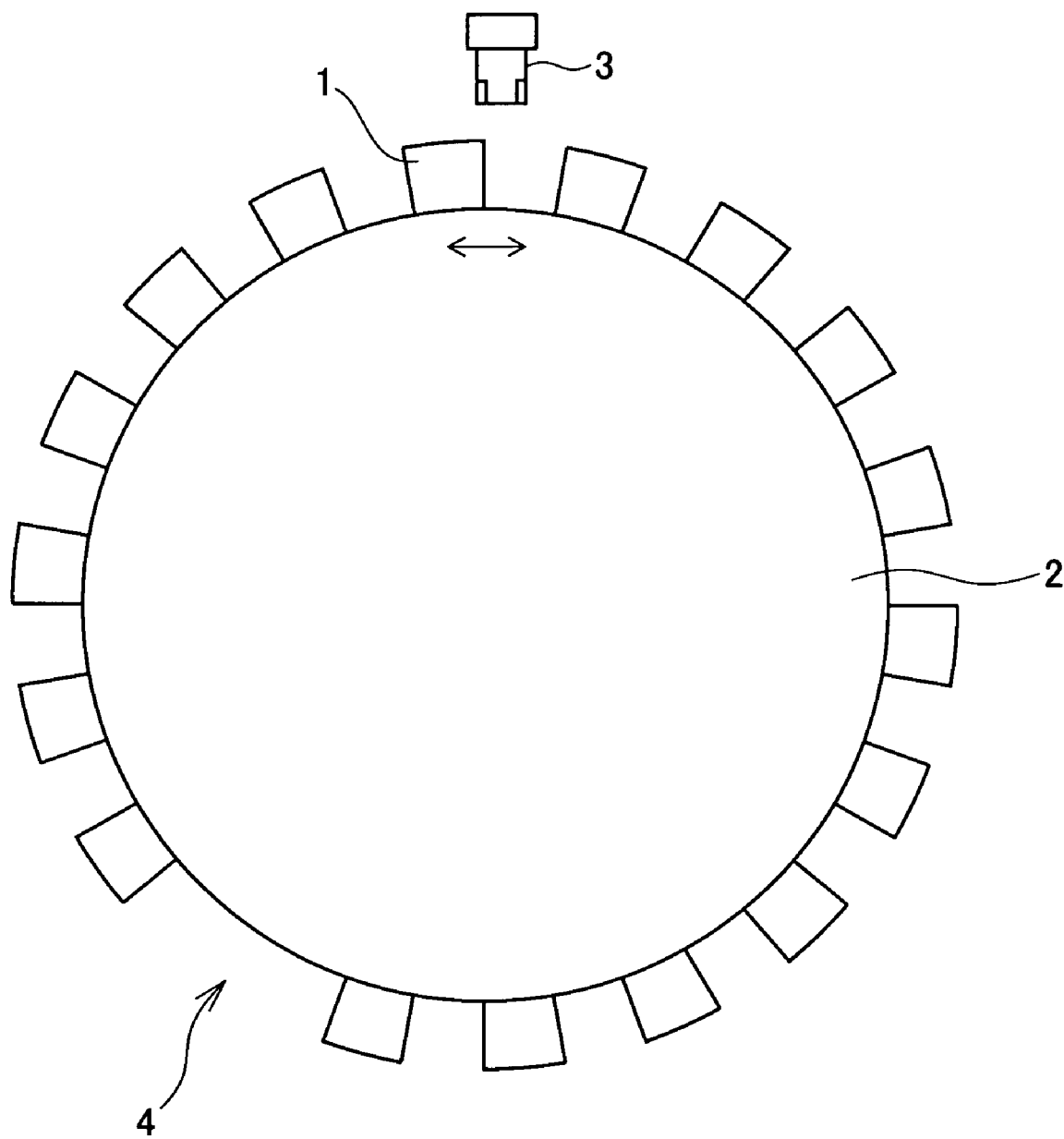

The crank sensor 35 is produced in the same configuration as that shown in FIG. 10. That is, the crank sensor 35 has a crank rotor 2 with a plurality of protrusions 1 formed on the outer circumference thereof and a pickup 3 that faces the protrusions with a gap therebetween. The protrusions 1 are arranged at intervals in the circumferential direction of the crank rotor 2. The crank sensor 35 outputs, as shown in FIG. 4, a crank signal having an effective edge in a specified direction (in this example, a rising edge) every time when the crankshaft of the engine 11 rotates by a predetermined angle range (for example, 10 degrees) corresponding to each interval between protrusions 1.

The cam sensor 37 is configured to respond to the rotation of the cam shaft associated with the crankshaft and outputs a cam signal which changes in a pulse form when the cam shaft arrives as a specified rotational position. The cam sensor 37 has the same structure as that of the crank sensor 35. As a variation, the cam sensor 37 may be produced to output a cam signal which changes between high and low levels depending on rotational positions of the cam shaft.

Moreover, the engine ECU 13 is provided with a crank counter whose count shows a crank position (i.e., the rotational position of the crankshaft). Hence, in cases where the crank position cannot be detected in periods such as a period immediately after its activation start, the crank signal and the cam signal are both used to detect the crank position. Hence, in this initial situation, a value showing the detected crank position is set to the crank counter. Thereafter, whenever the crank signal is given as an input, that is, whenever the crank signal exhibits an effective edge (a rising edge), the engine ECU 13 updates the count of the crank counter. This update manner makes the engine ECU 13 detect the newest crank position at any time, so that, based on the count of the crank counter, the engine ECU 13 performs the control of the fuel injection and ignition to the engine 11 by supplying current to the injector 39 and the ignition device in a controlled manner. Of course, this control technique is known.

Referring to a flowchart shown in FIG. 2, a process executed by the eco-run ECU 15 will now be described.

The eco-run ECU 15 includes a microcomputer 15a which is in charge of controlling the operations of this ECU 15, in addition to other necessary components such as memories. The process shown in FIG. 2 is thus executed by the microcomputer 15a at intervals.

Figure 2:
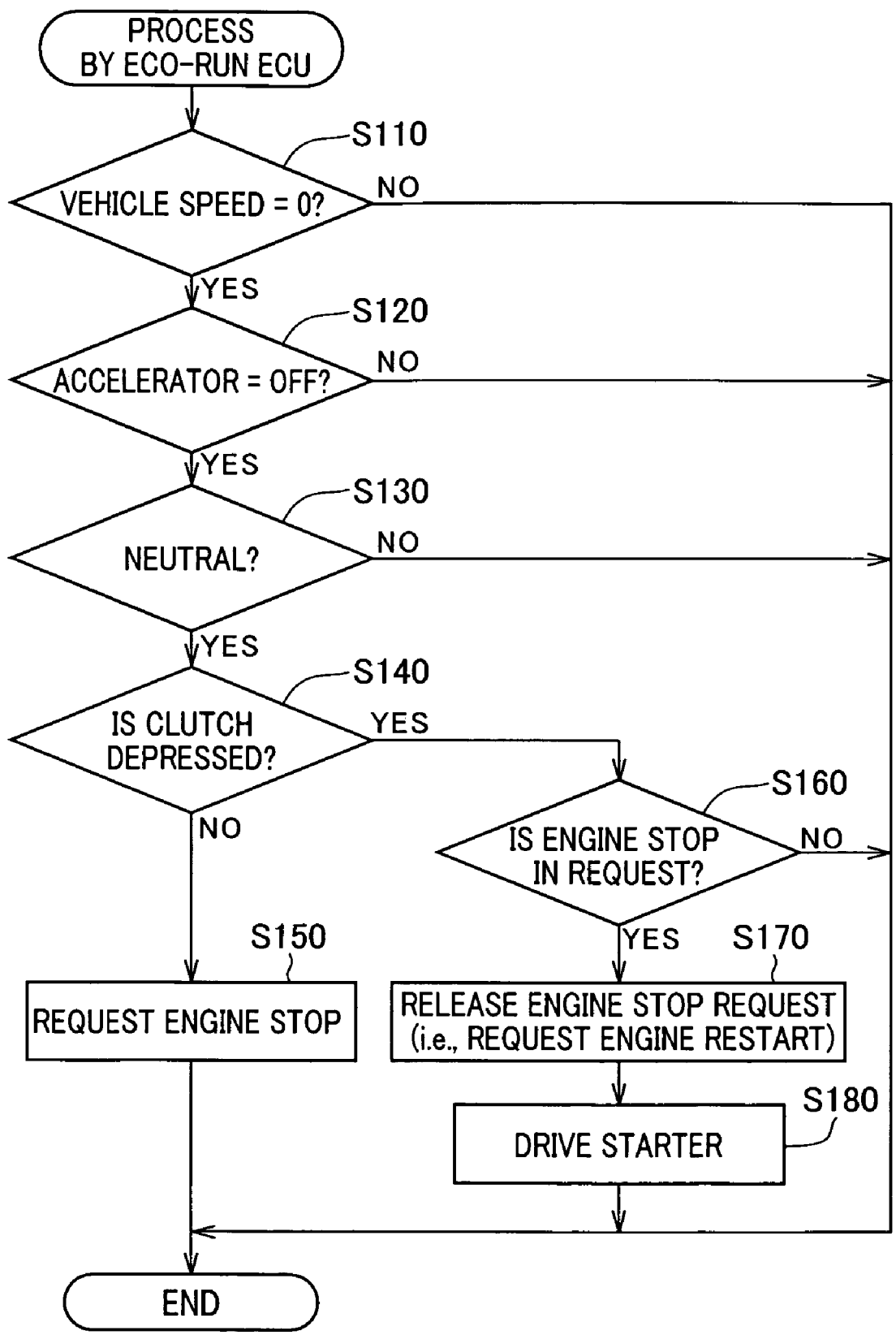
FIG. 2 is flowchart showing a process performed by a microcomputer incorporated in an eco-run ECU adopted by the idle stop control apparatus according to the first embodiment.

When the process shown in FIG. 2 is stated, the microcomputer 15a of the eco-run ECU 15 determines, at step S110, whether or not the vehicle speed is zero on the basis of the signal from the vehicle speed sensor 21. If the vehicle speed is zero, the microcomputer 15a determines, as the next step S120, determines whether or not the accelerator pedal is depressed (i.e., the acceleration is OFF) based on the signal corn the accelerator switch 23. When the accelerator pedal is not stepped on, the process proceeds to step S130, where the microcomputer 15a determines whether or not the shift lever is at its neutral position based on the signal from the neutral switch 25. When the determination reveals that the shift lever is at the neutral position, the process is allowed to proceed to step S140.

At step S140, the microcomputer 15a determines whether or not the clutch pedal is depressed, on the basis of the signal from the clutch switch 27. The determination NO at this step, that is, no stepping on the clutch pedal, allows the process to proceed to step S150, where the microcomputer 15a, that is, the eco-run ECU 15 issues a request for stopping the operations of the engine to the engine ECU 13 via the communication line 35. The process shown in FIG. 2 is then ended during an interval lasting until start of the next control cycle.

In other words, the eco-run ECU 15 decides that engine stop conditions are met, when the vehicle speed is zero, the accelerator pedal is not stepped on, the shift lever is at its neutral position, and the clutch pedal is depressed. This decision will lead to issuing the engine stop request, as above.

When receiving the engine stop request, the engine ECU 13 will order the engine 11 to stop by stopping the fuel injection to the engine 11, as stated later. In the present embodiment, the engine stop request is provided in a form that a specific one-bit data in a train of data transmitted from the eco-run ECU 15 to the engine ECU 13 is "1." Hereinafter, this specific one-bit data is referred to as an engine stop request data. At step S150, the eco-run ECU 15 sets the engine stop request data to "1", before transmitting it to the engine ECU 13. Hence when the engine stop request data to be transmitted to the engine ECU 13 changes from "1" to "0," this means releasing the engine stop request.

On the other hand, when it is determined that the vehicle speed is not zero (No at step S110), it is determined that the accelerator pedal is depressed (No at step S1209, or it is determined that the shift lever is not at its neutral position (No at step S130), the process shown in FIG. 2 is ended.

Further when the determination at step S140 shows that the clutch pedal is depressed, the process is made to proceed to step S160, where it is further determined whether or not the engine stop is in request to the engine ECU 13.

"The engine stop is requested" shows a state where the engine stop request has been transmitted from the eco-run ECU 15 to the engine ECU 13. Specifically, this state means that the engine stop request data of "1" has been transmitted at step S150 but the engine stop request is not set to "0" yet.

When it is determined at step S160 that the engine stop is not in request, the process shown in FIG. 2 is ended. In contrast, when it is determined at step S160 that the engine stop is in request, the process proceeds to step S170 to release the engine stop request directed to the engine ECU 13. Practically, the engine stop request data is set to "0", and transmitted to the engine ECU 13.

Then the process proceeds to step S180, where the starter relay 31 is made ON to activate the starter 29, thereby cranking the engine 11 before ending the process shown in FIG. 2.

In this way, the eco-run ECU 15 stops the engine 11 by transmitting the engine stop request to the engine ECU 13 when the engine stop conditions are met. In this engine stop state, when the eco-run ECU 15 detects that the clutch pedal is depressed. That is, when the determination results at both steps S140 and S160 are YES, the eco-run ECU 15 decides that engine start conditions, on which the engine should be restarted, are accomplished, and releases the engine stop request to the engine ECU 13 (i.e., the engine start request is issued) and activates the starter 29 to restart the engine 11 (steps S170 and S180).

Figure 3A:
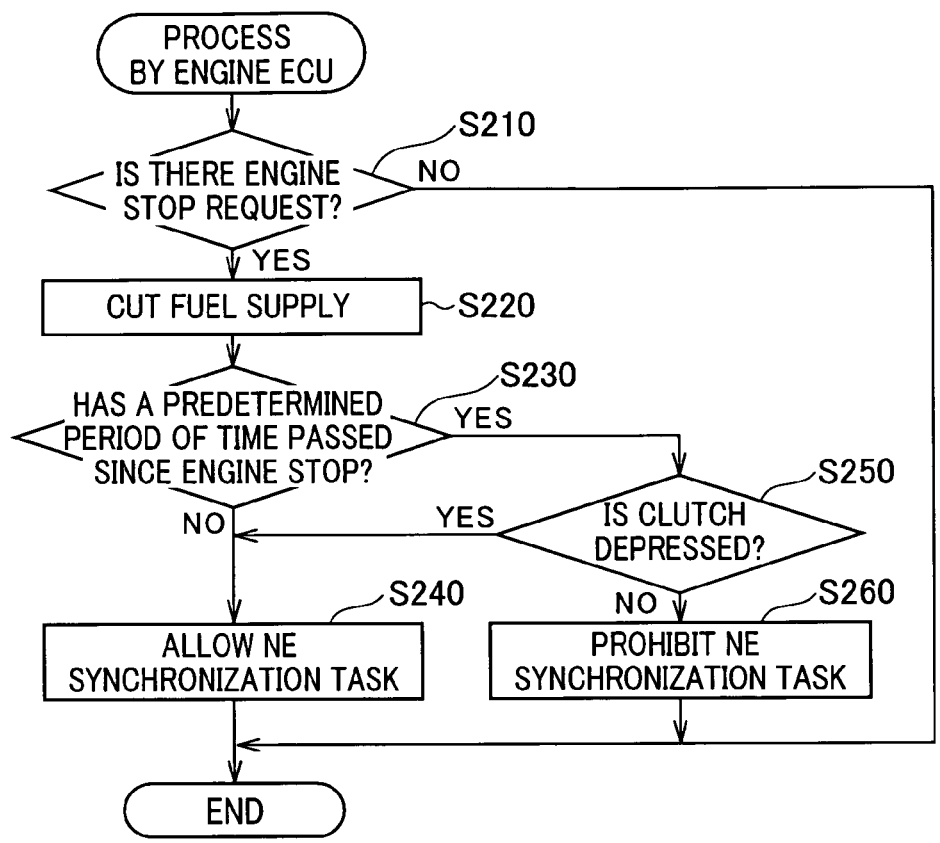
FIGS. 3A and 3B are flowcharts showing processes performed by a microcomputer incorporated in an engine ECU adopted by the idle stop control apparatus according to the first embodiment.
Figure 3B:
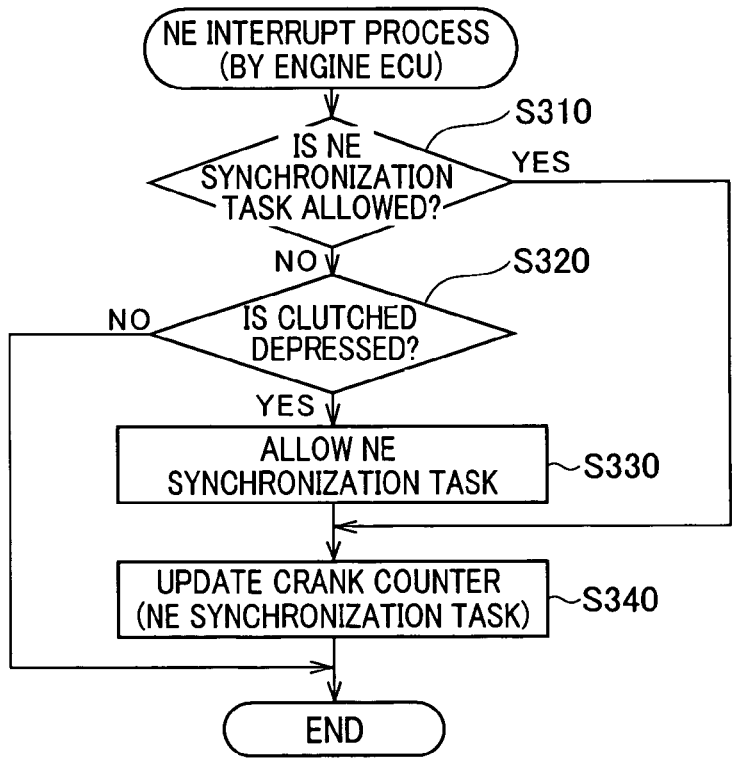

Referring to FIGS. 3A and 3B, a process performed by the engine ECU 13 will now be described.

The engine ECU 13 is also provided with, in addition to various components such as memories, a microcomputer 13a which is a processing part of this ECU 13. The steps of the process shown in FIG. 3 are thus functionally carried out by the microcomputer 13a based on previously given software procedures according to the steps in FIGS. 3A and 3B.

The process shown in FIG. 3A is performed by the microcomputer 13a as a regular routine at intervals. This process is directed to controlling the idle stop.

In the engine ECU 13, when the microcomputer 13a starts to perform the regular routine shown in FIG. 3A, the step at S210 comes first, where it is determined whether or not the engine stop request has come from the eco-run ECU 15. Namely the determination is made by checking that the engine stop request data received from the eco-run ECU 11 is "1" or not. If this determination shows that there is no engine stop request, the regular routine is ended without performing any steps. Meanwhile, if the determination shows the opposite result, that is, no engine stop request, the process proceeds to step S220.

The step S220 is provided to stop injecting the fuel into the engine 11, so that the engine 11 is made to stop.

The process then proceeds to step S230, where it is determined whether or not a predetermined period of time has passed since the time instant when the crank signal stopped from being provided from the crank sensor 35. That is, this predetermine period of time is counted as a time elapsing after the last input of the crank signal. If this predetermined period of time has not passed yet (NO at step S230), the execution of an NE (or Ne) synchronization task (described later) is allowed. The "NE" represents an engine revolution number. This allowance is made by setting an allowance/non-allowance flag, which shows whether or not the performance of the NE synchronization task is allowed, to a value showing the allowance (e.g., the value is "1"). Then the present regular routine ends.

The NE (engine revolution number) synchronization task is a task for a later-described crank counter update process (step S340 in FIG. 3B), which is started during an interrupt process shown in FIG. 3B. This interrupt process is activated every time the crack signal is received, and referred to as an NE interrupt process. In the state where there is no engine stop request from the eco-run ECU 15, the allowance/non-allowance flag is set to the value showing the allowance, so that the NE synchronization task is allowed from being performed. Hence, as a modification, when it is determined at step S210 that there is no engine stop request, the step at S240 may be performed immediately after the step S210. Incidentally, the predetermined period of time used at step S230 is set to a period which gives a reasonably certain estimate that the engine 11 completely stops its rotation during the predetermined period.

Meanwhile, when the determination at step S230 reveals that the predetermined time of period has passed, the process proceeds to step S250, where it is further determined if or not the clutch pedal is depressed. This determination is carried out using the signal coming form the clutch switch 27. When this determination at step S250 is NO, that is, no stepping on the clutch pedal, the step at S260 is performed, where the allowance/non-allowance flag is set to a value showing the non-allowance (for example, "0"). Hence the NE synchronization task is prohibited from being performed, and the regular routine is ended.

When it is determined at step S250 that the clutch pedal is depressed, this situation means that the driver stepped on the clutch pedal during the automatic stop (i.e., idle stop) of the engine 11. In this case, it is determined that the engine start conditions are met, and the process proceeds to step S240. The performance of the NE synchronization task is thus allowed at step S240, before the present regular routine is ended.

In this way, in the regular routine shown in FIG. 3A, when the eco-run ECU 15 has issued the engine stop request (YES at step S210), the engine is stopped by cutting the fuel injection (step S220). In response to the stop of the engine 11, the timing at which the predetermined period of time has passed since no input of the crank signal is detected (YES at step S230). At this timing, it is confirmed that the clutch pedal is not stepped on yet (NO at step S250), and then the NE synchronization task is prohibited from being performed (step S260). When it is then detected that the clutch pedal is depressed (YES at step S250), the performance of the NE synchronization task is allowed (step S240).

Referring to FIG. 3B, the NE interrupt process will now be detailed.

When the microcomputer 13a of the engine ECU 13 starts the NE interrupt process, the microcomputer 13a performs step S310, where it is determined whether or not the performance of the NE synchronization task is allowed or not based on the allowance/non-allowance flag. When the determination at step S310 shows the allowance (i.e., the flag shows the value indicative of allowance), the process proceeds to step S340 in order to awake the NE synchronization task. Performing this task allows the crank counter to update its count. Practically, the value of the count is incremented by one. In addition, it is determined whether or not the count exceeds a maximum value representing 720°CA and if the count exceeds the maximum value, the count is returned to zero. Here "CA" stands for the crank angle. When the NE synchronization task started at step S340 ends, the NE interrupt process also ends.

In contrast, in cases where the performance of the NE synchronization task is not allowed at step S310 (i.e., the allowance/non-allowance flag shows the value indicative of the non-allowance to prohibit the NE synchronization task from being performed), the process proceeds to step S320. At this step, the signal from clutch switch 27 is used to determine if the clutch pedal is depressed. If this determination presents that the clutch pedal has not been stepped on yet, the NE interrupt process ends without starting NE synchronization task.

On the other hand, the step-S320 determination that the clutch pedal is depressed now means that the driver stepped on the clutch pedal during the automatic stop of the engine 11 for idle stop. Hence the microcomputer 13a decides that the engine start conditions are met, and proceeds to step S330. At this step, like the step S240 in FIG. 3A, the allowance/non-allowance flag is given its value indicating the allowance, thus allowing the performance of the NE synchronization task. At the next step S340, the NE synchronization task is started. After completion of this task, the NE interrupt process is ended.

Specifically, in the NE interrupt process in FIG. 3B, the NE synchronization task is started to update the count of the crank count at step S340, provided that the performance of the NE synchronization task is allowed (YES at step S310). In contrast, when the NE synchronization task is prohibited (NO at step S310), this task is not started except for the following situation. That is, in the processing of this current process cycle, when it is detected that the clutch pedal has been stepped on (YES at step S320), the performance of the NE synchronization task is allowed, so that this task is started in this current process cycle and subsequent process cycles (steps S330 and S340).

Although not shown, the microcomputer 13a of the engine ECU 13 also carries out another control process, which is activated at intervals or whenever the count of the crank counter reaches a preset value. In this control process, the count of the crank counter is referred, and depending on the referred count, current is supplied to the injector 39 and the ignition device.

Referring now to FIG. 4, the operations of the foregoing idle stop control apparatus will now be described.

In FIG. 4, before a time instant t1, the engine stop conditions are not met which are determined by the eco-run ECU 15. In this state, the engine 11 is in operation, during which the engine ECU 13 counts up the crank counter every time when the crank signal creates its rising edge. The counting up is conducted during the NE synchronization task started at step S340 in FIG. 3B. In addition, before the time instant t1, the engine ECU 13 uses the count of the crank counter to perform the fuel injection and ignition actions to and in the engine 11 in a controlled manner.

Then, it is assumed that the engine stop conditions are met at the time instant t1. At this time, such conditions are detected by the eco-run ECU 15, and an engine stop request is transmitted from the eco-run ECU 15 to the engine ECU 13 (step S150). In response to this request, the engine ECU 13 stops injecting fuel into the engine 11 (step S220). This is called fuel cut. Even if the fuel cut is performed, the crankshafts of the engine 11 continue to rotate slightly due to the fact that the crankshaft has inertia at the time of the fuel cut. Such slight rotation will cause the crank sensor to continue outputting the signal until the engine completely stops.

Thus, when the engine 11 stops due to the fuel cut, the count of the crank counter is no longer updated on account of no input of the crank signal to the engine ECU 13. This allows the crank counter to keep its count measured at the time when the engine 11 stops.

In the engine ECU 13, at a time instant when a predetermined period of time has passed since the input of the crank signal was stopped due to the fuel cut, the NE synchronization task (i.e., the update of the crank counter) becomes prohibited from being performed (YES at step S230, to NO at step S250, to step S260).

Then, at a time instant t2, assume that the driver steps on the clutch pedal. In this situation, the eco-run ECU 15 detects the driver's stepping-on action (YES at step S140), releases the engine stop request to the engine ECU 13, and activates the starter 29 to crank the engine 11 (steps S170 and S180). Accordingly, the engine ECU 13 again starts to receive the crank signal.

In this situation, the engine ECU 13 performs step S250 in FIG. 3A or step S320 in FIG. 3B, in which it is detected that the clutch pedal has been stepped in (that is, the engine start conditions are met). Accordingly, the performance of the NE synchronization task is allowed (YES at step S250 to step S240, or, YES at step S320 to step S330).

Hence, when the crank signal starts to be inputted to the engine ECU 13 because of cranking the engine 11, the crank counter again counts up its count from the value kept when the engine 11 was stopped. Updating the crank counter make it possible to resume the fuel injection and ignition based on the control process stated before, restarting the engine 11. Namely, the control process is executed such that, when the count of the crank counter reaches a specific preset value, current supply to the injector 39 and the ignition device is started at a time instant at which a predetermined period of time passes since the time instant at which the count reached the specific value. The predetermined period of time is decided depending on conditions such as engine rotation number.

In particular, when the engine ECU 13 stops the engine 11 on the engine stop request, the NE synchronization task is prohibited from being performed until when it is detected that the engine start conditions (stepping on the clutch pedal) are met.

Hence, even when noise occurs in the crank signal, as shown in FIG. 4, during the idle stop of the engine 11, it is reliably avoidable that the count of the crank counter is resulted in being updated erroneously.

The count of the crank counter can therefore be kept at a correct value until the restart of the engine 11. In restarting the engine 11, it is thus preventable to perform the fuel injection and ignition based on an erroneous crank position. As a result, the restart of the engine 11, which should be performed after the idle stop, can be kept in a higher and more reliable performance any time.

FIG. 4 shows in its lowest stage the count of the crank counter, which includes changes shown by a dotted line. This dotted line exemplified a drawback concerning a conventional crank counter of which count results in being updated erroneously responsively to noise occurring in the crank signal. In the case shown by the dotted line, the engine 11 has to restart in a state where the count of the crank counter is higher than a value gained when the engine stopped. This will lead to erroneously performing the fuel injection and ignition based on a faulty crank position. In contrast, the present embodiment is able to overcome such a drawback, because the engine ECU 13 is able to avoid the count of the crank count from being updated.

Further the engine ECU 13 determines that the engine 11 has stopped completely when the predetermined period of time has passed since the start of no input of the crank signal. The predetermined period of time is set to a time length which makes it possible that the engine 11 is supposed to stop completely. Only when this determination comes out, the NE synchronization task is prohibited.

Hence it can be determined in a correct manner whether or not the engine 11 has stopped completely, even though the period of time necessary for determining the stop of the engine 11 becomes longer. Hence, it is reliably avoided that the NE synchronization task is forcibly prohibited from being performed (i.e., incorrectly missing out the updates of the crank counter can be prevented) in a state where the engine 11 is still in operation at extremely lower rotation speeds.

Furthermore, in the present embodiment, stepping on the clutch pedal is given as the engine start condition. Also the engine ECU 13 determines whether or not the engine start conditions are met or not met on the basis of the signal coming from the clutch switch 27. In consequence, at about the same time when the eco-run ECU 15 detects that the engine start conditions have been met, the engine ECU is able to detect the realization of the engine start conditions. It is therefore possible, in restarting the engine 11, to avoid, without fail, the crank counter from being missed in its update due to delay in releasing the prohibition of the NE synchronization task.

Moreover, in both the regular routine shown in FIG. 3A and the NE interrupt process shown in FIG. 3B, the microcomputer 13a of the engine ECU 13 determines whether or not the engine start conditions are met. Accordingly in comparison with the determination of only the regular routine, it is highly possibly quicker to detect the engine start conditions have been met. Delay in releasing the prohibition of the NE synchronization task can therefore be avoided more reliably.

In the engine ECU 13, the NE synchronization task, i.e., the update of the count of the crank counter, is started in the NE interrupt process, while the NE interrupt process is skipped without awaking the NE synchronization task whenever the allowance/non-allowance flag is set to the value indicating the non-allowance. In the regular routine shown in FIG. 3A, by setting that flag to the value indicating the non-allowance, the NE synchronization task is prohibited from being performed.

Hence, compared to a case where the NE interrupt process itself is prohibited so that the crank counter is prohibited from being updated, it is advantageous in that there can be provided a higher reliability in the operations. The reason is as follows. Since the software is available a switchover between the allowance and the prohibition of the crank counter update, it is not necessary to change the functional settings in response to an interrupt occurring the operation of the microcomputer, thus allowing the microcomputer to operate without treating interruptions, thus raising the reliability in the operations.

In the present embodiment, the eco-run ECU 15 functions as idle stop control means, the crank sensor 35 corresponds to the rotation sensor, and the crank signal serves as the rotation signal. The steps S230 to S260 in the regular routine and the step S310 to S330 in the NE interrupt process compose update prohibition means.

Second Embodiment

Figure 5:
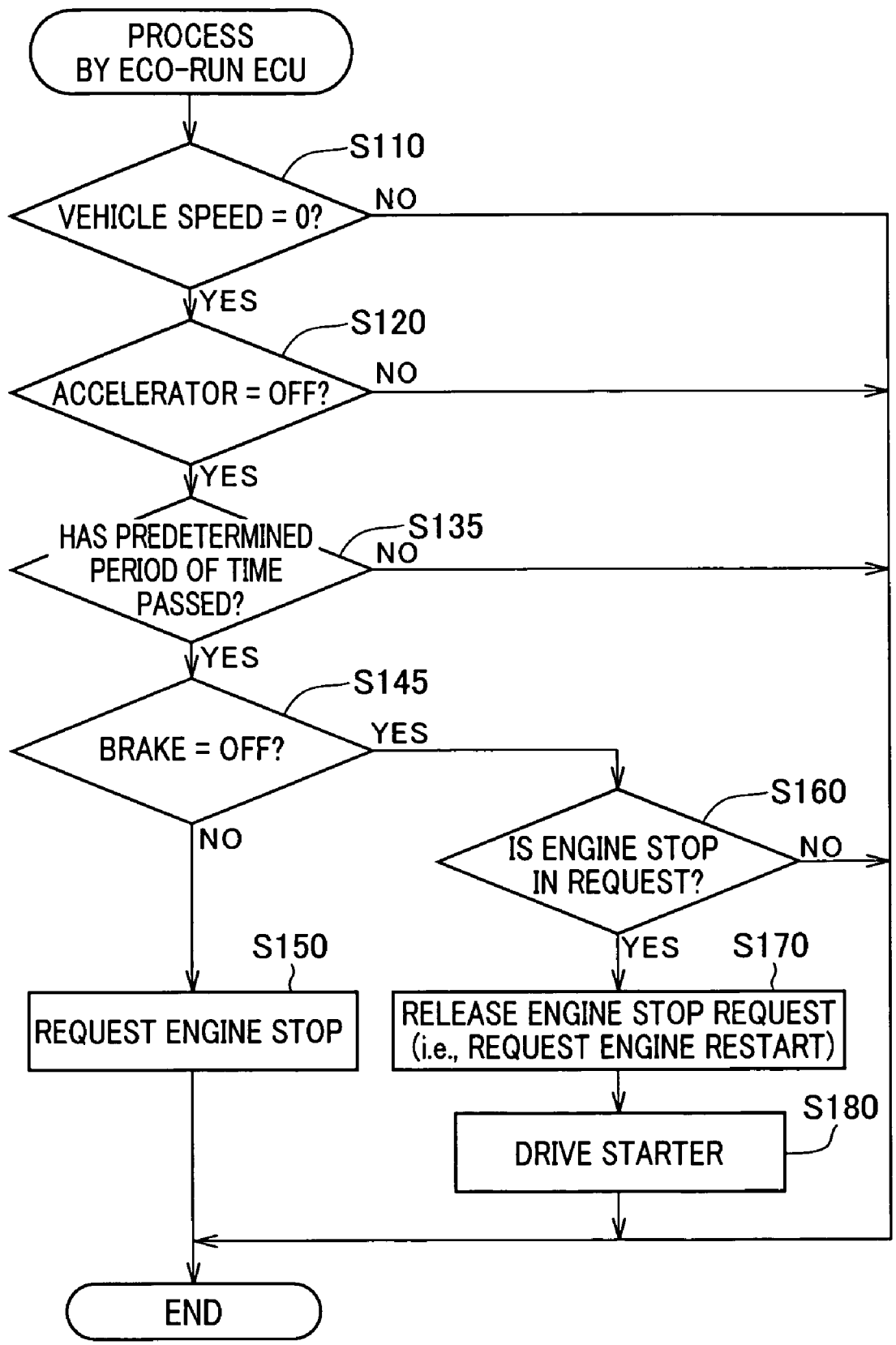
FIG. 5 is a flowchart showing a process performed by a microcomputer incorporated in an eco-run ECU adopted by the idle stop control apparatus according to a second embodiment of the present invention.
Figure 6A:
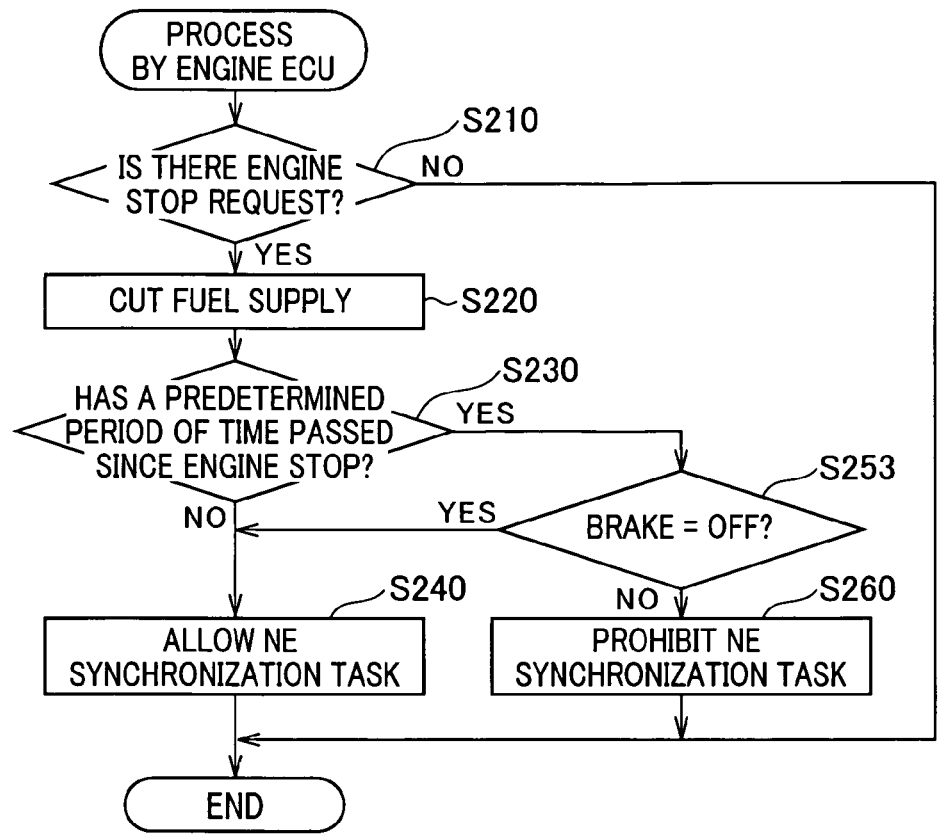
FIGS. 6A and 6B are flowcharts showing processes performed by a microcomputer incorporated in an engine ECU adopted by the idle stop control apparatus according to the second embodiment.
Figure 6B:
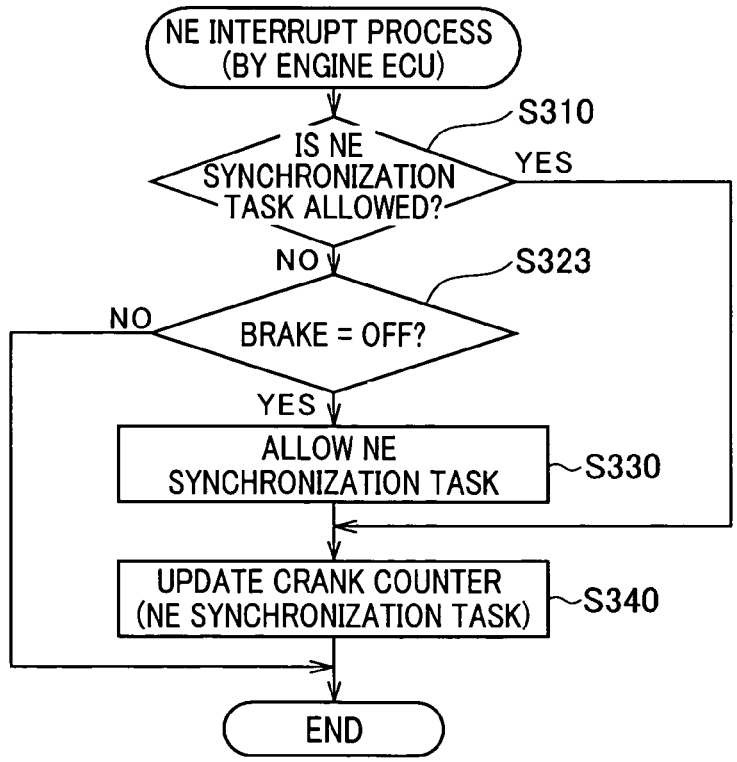

Referring to FIGS. 5 and 6A, 6B, an idle stop control apparatus according to a second embodiment of the present invention will now be described.

In the idle stop control apparatus according to the present embodiment, there are some configurations which differ from those described in the first embodiment. In the present embodiment and succeeding embodiments, for the sake of a simplified description, the same components in the second embodiment are given the same reference and omitted from being detailed or described.

In the second embodiment, a vehicle, to which the idle stop control apparatus is applied, has an automatic transmission, with no clutch pedal on the vehicle. To the eco-run ECU 15 and engine ECU 13, a signal is inputted from a brake switch (not shown) which is turned on when the brake pedal is depressed. The brake switch is a replacement for the neutral switch 25 and the clutch switch 27 described in the first embodiment.

The eco-run ECU 15, that is, the microcomputer 15a, will perform the process shown in FIG. 5, instead of that shown in FIG. 2. Compared to the process in FIG. 2, the process in FIG. 5 includes steps S135 and S145 in place of steps S130 and S140, respectively.

At step S135, it is determined whether or not a predetermined period of time has passed since a time instant where there is realized a state where the vehicle speed becomes zero and the accelerator pedal has not been stepped on. If the determination reveals that the predetermined period of time has not passed, the process in FIG. 5 is ended, while the determination reveals that the predetermined period of time has passed, the process proceeds to step S145.

It is determined at step S145 whether or not the brake pedal is not stepped on (i.e., brake is OFF), using the signal coming from the brake switch. When it is determined that the brake pedal is depressed, the process proceeds to step S150, where the eco-run ECU 15 transmits an engine stop request to the engine ECU 13. In contrast, the determination result of no step on the brake pedal will allow the process to proceed to step S160.

In this way, the eco-run ECU 15 determines whether or not the predetermined period of time has passed since a time instant where the vehicle speed became zero, the accelerator pedal has not been stepped on, and the brake pedal is depressed. If these conditions are satisfied, the eco-run ECU 15 decides that the engine stop conditions are met, and issues an ending stop request transmitted to the engine ECU 13. The eco-run ECU 15 is thus able to stop the rotation of the engine 11 using the engine stop request. When detecting a situation where the driver has stopped stepping on the brake pedal (YES at steps S145 and S160), the eco-run ECU 15 decides that the engine start conditions are satisfied which are for an engine restart. In response to this decision, the eco-run ECU 15 releases the engine stop request to the engine ECU 13 and actuates the starter 29 (steps S170 and S180). Lifting the driver's foot from the brake pedal is considered as a drive's intention to resume the vehicle travel.

In this way, the microcomputer 13a of the engine ECU 13 performs both of a regular routine shown in FIG. 6A, instead of that shown in FIG. 3A, and an NE interrupt process shown in FIG. 6B, instead of that shown in FIG. 3B.

In the regular routine in FIG. 6A, it is determined at step S253 (which is a replacement for step S250 in FIG. 3A) that, using the signal from the brake switch, the brake pedal is depressed. When the determination indicates the stepping-on action to the brake pedal, the process proceeds to step S260 to prohibit the NE synchronization task, whilst the opposite determination, i.e., on stepping-on to the brake pedal results in a driver's cancellation action from stepping on the brake pedal during the automatic stop of the engine 11. In this case, it is decided that the engine start conditions are fulfilled, so that the process proceeds to step S240, with the NE synchronization task allowed accordingly.

Similarly to the above, the NE interrupt process in FIG. 6B includes step S323 (which is a replacement for step S320 in FIG. 3B), where using the signal from the brake switch, it is determined whether or not the brake pedal is not stepped on. When the determination reveals a driver's stepping-on action, the NE interrupt process in the current control cycle is ended, while when the determination reveals no driver's stepping-on action, it is recognized that the engine start conditions are met. In this case, step S330 is performed to allow the NE synchronization task, and step S340 is performed to start this task. In this way, the second embodiment employs as the engine start conditions a driver's action of canceling stepping on the brake pedal (i.e., the brake is OFF). Hence the engine ECU 13 detects this action to switch the NE synchronization task from its prohibited condition to its allowed condition.

Accordingly, the engine ECU 13 according to the present embodiment is able to provide the same or similar advantages as or to those in the first embodiment. In particular, the engine ECU 13 uses the signal from the brake switch, which is similar to the eco-run ECU 15, to determine if or not the engine start conditions are met. It is therefore possible for the engine ECU 13 to detect the satisfaction of the engine start conditions about at the same time when the eco-run ECU 15 detects that satisfaction. In restarting the engine 11, it is prevented without fail that, due to delay in releasing the prohibition of the NE synchronization task, there occur some errors (missing counts) in updating the crank counter.

Third Embodiment

Referring to FIGS. 7A and 7B to 8, an idle stop control apparatus according to a second embodiment of the present invention will now be described.

Figure 8:
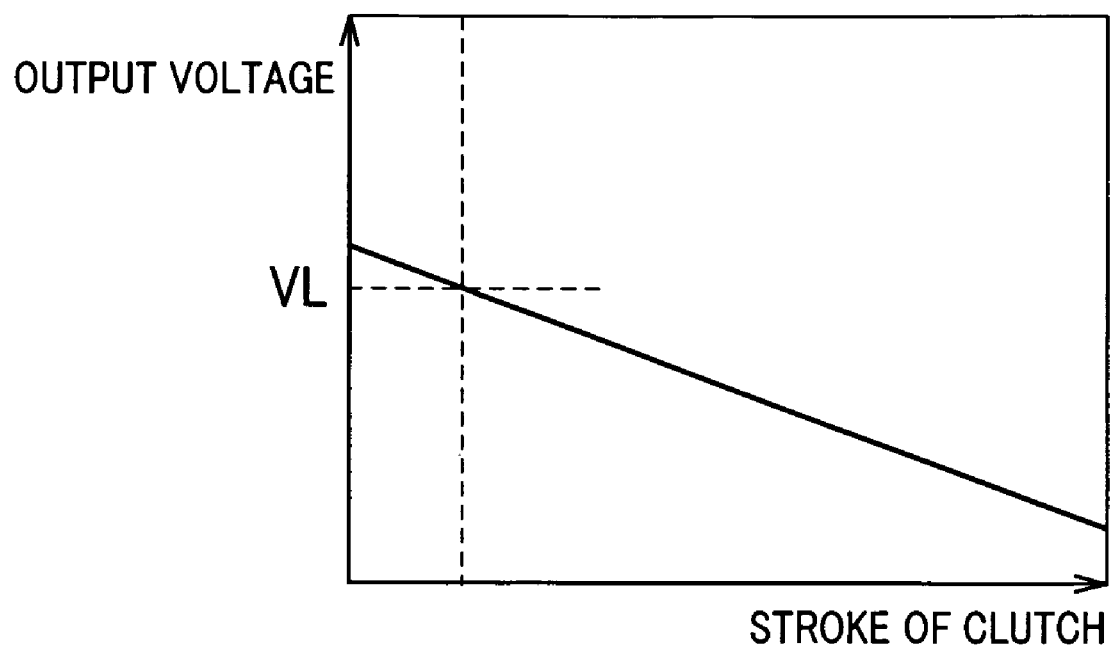
FIG. 8 is a graph showing the output characteristics of a clutch stroke sensor adopted in the third embodiment.

The engine ECU 13 according to the present embodiment receive a signal from a clutch stroke sensor (not shown) in place of the clutch switch 27. The clutch stroke sensor outputs the signal which changes depending on amounts of stepping on the clutch pedal. Specifically, as shown in FIG. 8, the clutch stroke sensor provides output voltage which decreases as an increase in the amounts of depression of the clutch pedal (i.e., clutch strokes).

Figure 7A:
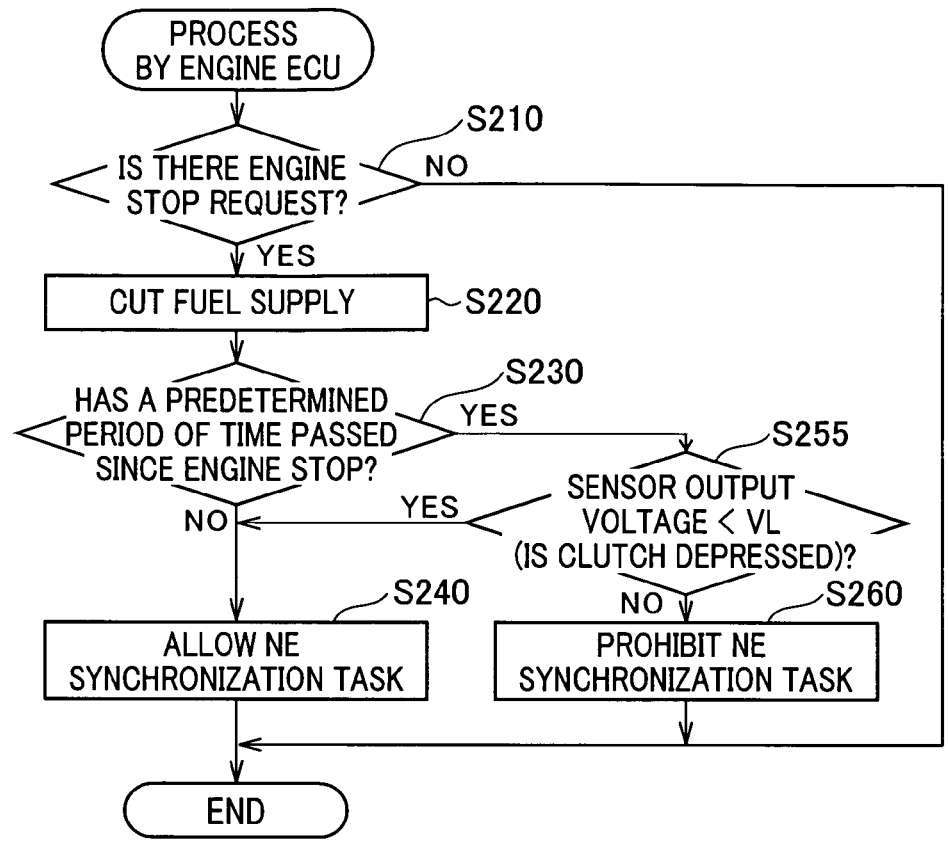
FIGS. 7A and 7B are flowcharts showing processes performed by a microcomputer incorporated in an engine ECU adopted by the idle stop control apparatus according to a third embodiment of the present invention.
Figure 7B:
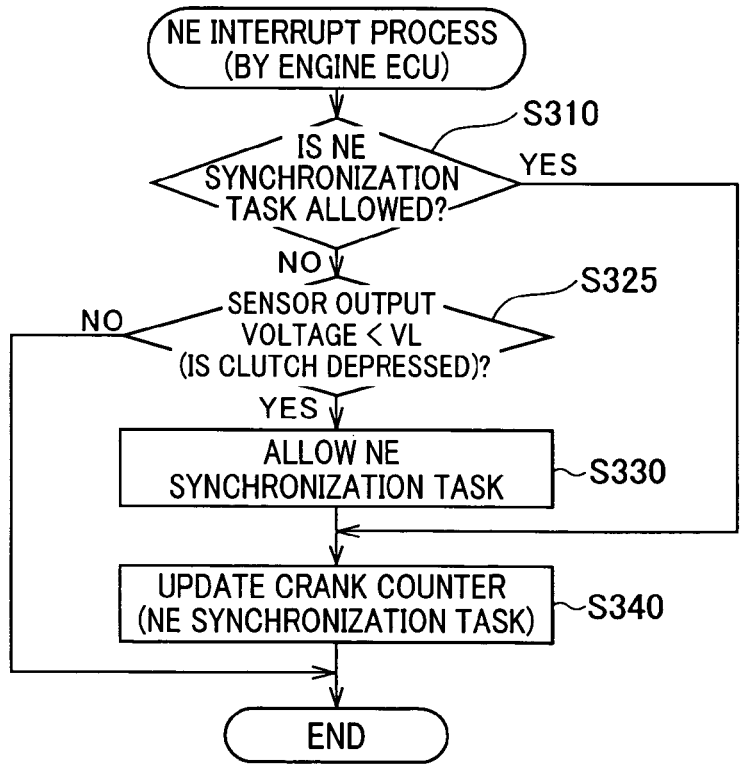

The microcomputer 13a of the engine ECU 13 performs the regular routine shown in FIG. 7A, instead of that shown in FIG. 3A, and performs the NE interrupt process shown in FIG. 7B, instead of that shown in FIG. 3B.

The regular routine shown in FIG. 7A includes step S255, which is a replacement for step S250 in FIG. 3A, and at step S255, the output voltage from the clutch stroke sensor is used to determined whether the clutch pedal is depressed or not. Practically, when the output voltage, i.e., sensor voltage of the clutch stroke sensor is lower than a preset value VL showing a half-clutched state (refer to FIG. 8), it is determined that the clutch pedal is depressed now. The preset value VL can be changed on design as long as changed values are able to give a correct estimation that the clutch pedal is depressed.

In the same way as the above, the NE interrupt process in FIG. 7B employs step S325, which is a replacement for step S320 in FIG. 3B, to determine whether or not the clutch pedal is depressed using the output signal from the clutch stroke sensor.

Hence, the engine ECU 13 is able to detect a driver's stepping-on action to the clutch pedal at the stage where the half-clutched state is established. It is therefore possible to decide the satisfaction of the engine start conditions earlier than that in the first embodiment, thereby speeding up timing to release the prohibition of the NE synchronization task.

In the present embodiment, there are some modifications. For instance, the signal form the clutch stroke sensor may be given to the eco-run ECU 15 as well. In this modification, step S140 in FIG. 2 is allowed to perform the same determination as those at steps S255 and S325 in FIG. 7. The clutch stroke sensor may be modified into a type of sensor whose output voltage is larger as the clutch stroke becomes larger.

Fourth Embodiment

Figure 9A:
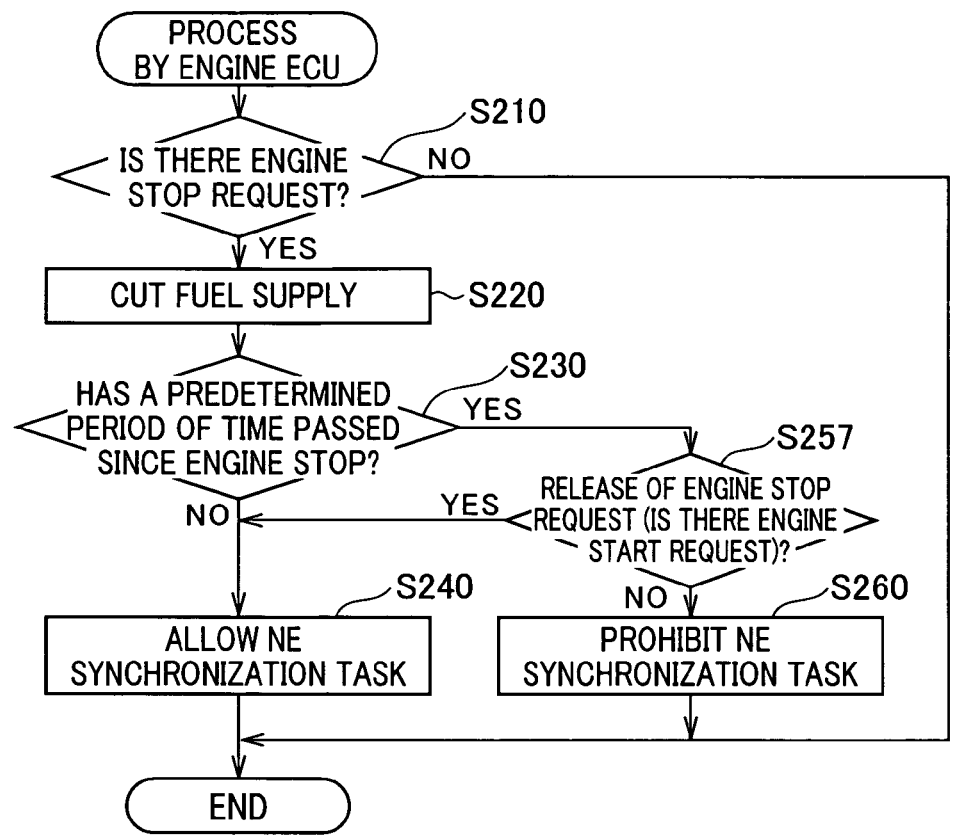
FIGS. 9A and 9B are flowcharts showing processes performed by a microcomputer incorporated in an engine ECU adopted by the idle stop control apparatus according to a forth embodiment of the present invention.
Figure 9B:
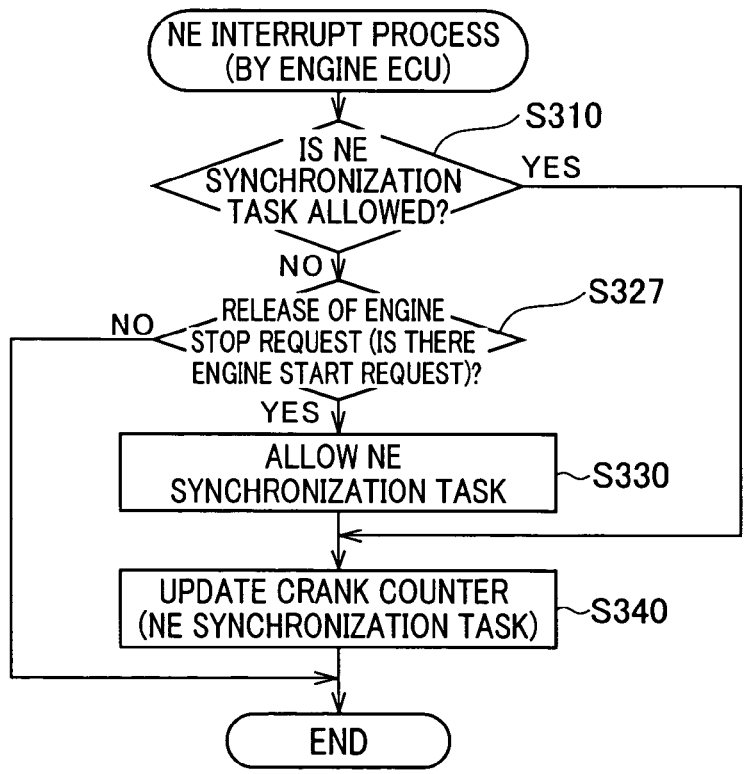

Referring to FIGS. 9A and 9B, an idle stop control apparatus according to a forth embodiment of the present invention will now be described.

Compared to those in the first to third embodiments, the idle stop control apparatus of the forth embodiment differs as follows.

The microcomputer 13a of the engine ECU 13 performs a regular routine shown in FIG. 9A and an NE interrupt process in FIG. 9B. The regular routine in FIG. 9A proceeds to step S240 in cases where it is determined at step S210 that there is issued no engine stop request.

Moreover, in the regular routine in FIG. 9A includes step S257, which is a replacement for step S250 in FIG. 3A, step S253 in FIG. 6A, or step S255 in FIG. 7A. At step S257, it is determined whether or not the engine stop request issued from the eco-run ECU 15 has been released (i.e., the engine start request has been received). More specifically, it is determined whether or not the engine stop request data from the eco-run ECU 15 has changed from "1" to "0." When the determination indicates that he engine stop request has not been released yet, the process proceeds to step S260, where the performance of the NE synchronization task is maintained to be prohibited. By contrast, if it is determined that the engine stop request has been released (in other words, the engine start request has been received), it is regarded as satisfying the engine start conditions, before proceeding to step S240 where the NE synchronization task is allowed again.

In the NE interrupt process in FIG. 9B, a step S327 is provided, which is a replacement for step S320 in FIG. 38, step S323 in FIG. 6B, or step S325 in FIG. 7B. At step S327, it is determined whether or not the engine stop request from the eco-run ECU 15 has been released. When the engine stop request is not released, this process is ended, but when it is determined that the engine stop request has been released, the process proceeds to step S330 on the assumption that the engine start conditions are met. At this step S330, the NE synchronization is allowed to be performed again, and at step S340, the NE synchronization task is started.

In the forth embodiment, the engine ECU 13 determines whether or not the engine start conditions are satisfied, by determining whether or not the engine start request have received from the eco-run ECU 15. In this configuration, for determining the satisfaction of the engine start conditions, there is no need to making signals from the switches and sensors input to the engine ECU 13. This is an advantageous point over the previous embodiments. Such signals are the signal from the clutch switch 27, brake switch or clutch stroke sensor, as described.

The eco-run ECU 15 transmits the engine start request, and then actuates the starter 29 (steps S170 and S180). Hence, as long as delay in communication between the engine ECU 13 and the eco-run ECU 15 is small, the engine ECU 13 is able to allow the NE synchronization task at a time instant or before this time instant when the first pulse of the crank signal generated with cranking the engine 11 comes in. In other words, there will occur no drops in the count of the crank counter.

If there is a large delay in communication between both ECUs 13 and 15 to an extent that the allowance of the NE synchronization task is missed from the first pulse of the crank signal, the configurations described in the first to third embodiments may be employed.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

For example, the foregoing embodiments adopt both the engine ECU 13 and the eco-run ECU 15 which are separated from each other. However, this is just an example, and the circuitry for the eco-run ECU 15 may be functionally realized within the engine ECU 13.

The engine control apparatus according to the foregoing embodiments may be incorporated in a single hardware unit. In such a case, means for the idle stop control may be prepared within the engine control apparatus or outside the engine control apparatus as a separate unit. Either way of arranging the idle stop control means in the inside or outside the engine control apparatus composes the apparatus for controlling the operations of the engine, which is according to the present invention. The clutch switch 27 may be modified into a type of switch in which stepping on the clutch pedal turns the switch off and, similarly to this, the brake switch may be formed such that stepping on the brake pedal turns the switch off.

In addition, the crank counter may be updated using the cum signal from the cam sensor, to which the present invention may be applied as well.

The engine to which the present invention can be applied may be diesel engines.

The engine stop conditions may be modified into other forms, not limited to that described in the foregoing embodiments.

What is claimed is:

1. An apparatus for controlling rotation of an engine mounted on a vehicle, the engine being equipped with a crankshaft, comprising:

updating means for updating a count of a counter based on a signal changing in accordance with rotation of the crankshaft, the count indicating a rotational position of the crankshaft; and engine control means for controlling the rotation of the engine based on the count of the counter, the engine control means includes idle stop control means issuing a request to stop the rotation of the engine when it is determined that a condition for stopping the rotation of the engine is met, and then issuing a command to crank the engine for restarting the engine when it is determined that a condition for restarting the engine is met; and update prohibiting means for prohibiting the counter from being updated during a period of time ranging from a time instant when the engine stops from rotating in response to the request to stop to a time instant when it is determined that the condition for restarting the engine is met.

2. The apparatus of claim 1, wherein the update prohibiting means includes means for determining whether or not a predetermined period of time has passed since no input of the signal to the apparatus, and means for prohibiting the count of the counter from being updated when it is determined that the predetermined period of time has passed since no input of the signal.

3. The apparatus of claim 2, wherein the vehicle is provided with a manually operated transmission equipped with a clutch pedal and the condition for restarting the engine is set to a condition that a driver in the vehicle steps on the clutch pedal.

4. The apparatus of claim 2, wherein the condition for restarting the engine is set to a condition that a driver in the vehicle stops depressing a brake pedal of the vehicle.

5. The apparatus of claim 2, wherein the idle stop control means includes means for issuing a request for restarting the engine when the condition for restarting the engine is met, and the update prohibiting means includes means for allowing the count of the counter to be updated in response to the issuance of the request for restarting the engine.

6. The apparatus of claim 2, wherein the update prohibiting means is functionally realized by a microcomputer incorporated in the apparatus, in which the microcomputer determines whether or not the condition for restarting the engine is met, at two kinds of timings consisting of regular-interval timings at which a regular process to determine the condition for restarting the engine is activated at regular intervals and interrupt timings at which an interrupt process to determine the condition for restarting the engine is activated.

7. The apparatus of claim 2, wherein the update of the counter is performed during an interrupt process activated whenever the signal changing in accordance with rotation of the crankshaft is given, the interrupt process uses information indicative of whether or not the update of the counter is allowed from being executed, in such that the update of the counter is skipped from being performed when the information shows non-allowance of the update of the counter, and the update prohibiting means is configured to prohibit the update of the counter by making the information show the non-allowance of the update of the counter.

8. The apparatus of claim 1, wherein the vehicle is provided with a manually operated transmission equipped with a clutch pedal and the condition for restarting the engine is set to a condition that a driver in the vehicle steps on the clutch pedal.

9. The apparatus of claim 8, wherein the update prohibiting means includes means for determining whether or not the condition for restarting the engine is met based on a signal from an on/off switch detecting a driver's stepping-on action on the clutch pedal.

10. The apparatus of claim 8, wherein the update prohibiting means includes means for determining whether or not the condition for restarting the engine is met based on a signal outputted from a sensor, the signal of the sensor reflecting a degree to which the clutch pedal is depressed by the driven.

11. The apparatus of claim 8, wherein the idle stop control means includes means for issuing a request for restarting the engine when the condition for restarting the engine is met, and the update prohibiting means includes means for allowing the count of the counter to be updated in response to the issuance of the request for restarting the engine.

12. The apparatus of claim 8, wherein the update prohibiting means is functionally realized by a microcomputer incorporated in the apparatus, in which the microcomputer determines whether or not the condition for restarting the engine is met, at two kinds of timings consisting of regular-interval timings at which a regular process to determine the condition for restarting the engine is activated at regular intervals and interrupt timings at which an interrupt process to determine the condition for restarting the engine is activated.

13. The apparatus of claim 8, wherein the update of the counter is performed during an interrupt process activated whenever the signal changing in accordance with rotation of the crankshaft is given, the interrupt process uses information indicative of whether or not the update of the counter is allowed from being executed, in such that the update of the counter is skipped from being performed when the information shows non-allowance of the update of the counter, and the update prohibiting means is configured to prohibit the update of the counter by making the information show the non-allowance of the update of the counter.

14. The apparatus of claim 1, wherein the condition for restarting the engine is set to a condition that a driver in the vehicle stops from stepping on a brake pedal of the vehicle.

15. The apparatus of claim 14, wherein the update prohibiting means includes means for determining whether or not the condition for restarting the engine is met based on a signal from an on/off switch detecting a driver's stepping-on action on the brake pedal.

16. The apparatus of claim 14, wherein the idle stop control means includes means for issuing a request for restarting the engine when the condition for restarting the engine is met, and the update prohibiting means includes means for allowing the count of the counter to be updated in response to the issuance of the request for restarting the engine.

17. The apparatus of claim 14, wherein the update prohibiting means is functionally realized by a microcomputer incorporated in the apparatus, in which the microcomputer determines whether or not the condition for restarting the engine is met, at two kinds of timings consisting of regular-interval timings at which a regular process to determine the condition for restarting the engine is activated at regular intervals and interrupt timings at which an interrupt process to determine the condition for restarting the engine is activated.

18. The apparatus of claim 1, wherein the idle stop control means includes means for issuing a request for restarting the engine when the condition for restarting the engine is met, and the update prohibiting means includes means for allowing the count of the counter to be updated in response to the issuance of the request for restarting the engine.

19. The apparatus of claim 1, wherein
the update prohibiting means is functionally realized by a microcomputer incorporated in the apparatus, in which the microcomputer determines whether or not the condition for restarting the engine is met, at two kinds of timings consisting of regular-interval timings at which a regular process to determine the condition for restarting the engine is activated at regular intervals and interrupt timings at which an interrupt process to determine the condition for restarting the engine is activated.

20. The apparatus of claim 1, wherein
the update of the counter is performed during an interrupt process activated whenever the signal changing in accordance with rotation of the crankshaft is given,
the interrupt process uses information indicative of whether or not the update of the counter is allowed from being executed, such that the update of the counter is skipped from being performed when the information shows non-allowance of the update of the counter, and
the update prohibiting means is configured to prohibit the update of the counter by making the information show the non-allowance of the update of the counter.

* * * * *